United States Patent Office 3,301,803
Patented Jan. 31, 1967

3,301,803
ASPHALT-ALDEHYDE-PHENOLIC COMPOUND
CONTAINING COMPOSITIONS
John W. Schick, Cherry Hill, and John H. Mahar, Scotch Plains, N.J., assignors to Mobil Oil Company, a corporation of New York
No Drawing. Filed June 15, 1964, Ser. No. 375,347
8 Claims. (Cl. 260—28)

This application is a continuation-in-part of our co-pending application Serial No. 299,586, filed August 2, 1963 and now abandoned.

The invention herein relates to new and useful asphalt-containing compositions, and relates more particularly to improved petroleum asphalt compositions, having a wide variety of useful properties, and to the method for their preparation.

Raw asphalt is, generally, commercially produced in the form of heavy bottoms obtained by the prior removal of the distillate portion of naphthenic or mixed base crudes. This raw asphalt, as obtained from the crude still, is exceedingly tough and flexible and can be used in various applications such as a binding agent in combination with other materials, or as a paving material, and also as a coating material. A problem encountered in the use of raw asphalt for these purposes is the characteristic of this material to soften at rising temperatures and even to melt, in many instances, at relatively low temperatures, for example, from about 80° F. to about 100° F., thus rendering it unsuitable for its intended use.

The aforementioned characteristic defects of raw asphaltic materials are well known to the art. It has been the practice, heretofore, to treat asphalt for the purpose of obtaining a material which is better able to withstand the deleterious effect of elevated temperatures. Conventional treatment, for this purpose, involves blowing heated asphalt with air in a tank maintained at elevated temperature. This blowing treatment is conducted for long periods of time until the asphalt has been oxidized to form a more heat-resistant product. Thus, for example, in practice, a Kuwait asphalt, having a softening point of 85° F. by the standard ring and ball test, can be air-blown at elevated temperature to produce a product having a ring and ball softening point of 240° F. Such air-blown asphalt will show a standard penetration of 8 at 77° F., 100 grams/5 seconds, a ductility of 0 at 77° F. and a solubility in carbon tetrachloride of about 99.5%.

The air-blowing of asphalt requires the use of bulky expensive equipment for long periods of time, and, must be carefully supervised over this lengthy period of treatment, and the treatment cannot be conducted outside the treating vessel. Furthermore, the penetration of air-blown asphalt is not sufficiently high for the many possible uses of this material.

It is, therefore, an object of the present invention to provide new and useful asphalt-containing compositions.

Another object of the invention is to provide new and useful asphalt-containing compositions having improved ring and ball softening points.

Still another object of the invention is to provide a new and improved method for obtaining the aforementioned asphalt-containing compositions.

Other objects and advantages inherent in the invention will become apparent to those skilled in the art from the following detailed description.

In accordance with the present invention, there are provided new and useful asphalt-containing compositions having improved ring and ball softening points, and which can be prepared at a significantly faster rate than heretofore commercially prepared conventional asphalt-containing compositions. These improved asphalt-containing compositions possess wide utility and are particularly useful in molding compounds for the manufacture of rods, pipes, sheets and other shaped articles. They are also useful in the impregnation of porous bodies such as wood, plaster of Paris, porous graphite parts and sintered metal moldings. They can be employed as coatings, for paving materials and other surfaces, or as seal-coatings. Furthermore, they can be used as binders in the manufacture of laminates and in combination with cellulosic particles, such as fibers, chips, shavings, sheets and similar materials derived from various forms of plants and trees. In one of its more specific aspects of utility these novel asphaltic compositions are useful in the manufacture of bonded wood products such as particle board laminates, fiber board, plywood and chip board. Boards manufactured employing the binders of this invention, may also contain other fibers such as fiberglass, asbestos, cotton and various other similarly related fiber materials.

The improved compositions of the present invention, as more fully hereinafter described, are prepared, in general, by reacting a major proportion of a petroleum asphalt with a minor proportion of an aldehyde and a minor proportion of a phenolic compound in the presence of an acidic catalyst at a temperature sufficiently high to effect condensation between the asphalt, aldehyde and phenolic components. In this respect, it is known to those skilled in the art that asphalts and aldehydes can be reacted at elevated temperature to up-grade the low melting point asphalts to asphalts of high melting points. However, in such practice it has been found that the resulting asphatic compositions are relatively hard, brittle, and comparatively rigid in structure. On the other hand, the treatment of a petroleum asphalt with an aldehyde and a phenolic compound in the presence of an acidic catalyst at a sufficiently elevated temperature results in effecting a condensation reaction between the asphalt, aldehyde and phenolic components, unlike the process of the prior art, and there is thus obtained an improved asphatic composition which is relatively flexible, and soft, by reason of its elevated ring and ball softening point. These improved properties of flexibility and softness, make these compositions particularly useful in the manufacture of the above-described products. Furthermore, by virtue of the phenolic component, improved paintability and strength in addition to increased fluidity and softness are also realized in the final product. Thus, the asphaltic compositions produced in accordance with conventional processes, are clearly distinct from the novel and significantly improved asphaltic compositions of the present invention.

With respect to the preparation of the improved asphaltic compositions of the present invention, the petroleum asphalt employed as the reactant with the aldehyde may comprise a virgin asphalt obtained by removing the distillate from a naphthenic base crude oil, or can, alternatively, comprise a cracked asphalt obtained from the thermal or catalytic cracking of heavy stocks to produce light materials, such as gasoline and fuel oil. An asphalt residue, is also obtained in the aforementioned cracking process which adequately serves as the petroleum asphalt in the aforementioned mixtures employed for the production of the improved asphaltic compositions. Heavy petroleum fractions comprising highly aromatic petroleum hydrocarbons may also be employed for this purpose. Thermal asphalt and other high-boiling fractions may be utilized, such as straight-run asphalts, heavy thermal gas oil, tar separator bottoms, syn-tower bottoms, coker charge-stocks, coker blowndown liquids, and the entire residuum from vacuum distillation of crude petroleum.

The aldehyde reactant, employed in making the novel improved asphaltic compositions of the present invention may comprise, in general, any compound having an active

group, characteristic of aldehydes. Contemplated herein are the aliphatic aldehydes and the aromatic aldehydes, including heterocyclic aldehydes. Non-limiting examples of the aldehydes include formaldehyde, acetaldehyde, propionaldehydes, butyraldehyde, acrolein, crotonaldehyde, tiglaldehyde, benzaldehyde, salicylaldehyde, cinnamaldehyde, and furfural. With respect to the use of the aforementioned aldehydes they may also be employed in their polymeric forms, for example, paraformaldehyde, and polymeric forms of any of the aforementioned aldehydes. It should also be noted, if so desired, that the aldehyde reactant may comprise mixtures of aldehydes and aldehyde polymers.

The phenolic compound that is employed in combination with the asphalt and aldehyde reactants, may comprise phenol itself and any alkyl phenols of sufficient reactivity, i.e., having at least two of the positions ortho or para to the hydroxyl group available for reaction. Non-limiting examples of the phenolic component are phenol, p-cresol, p-nonylphenol, resorcinol, p-amylphenol, m-butylphenol, p-tertbutylphenol, p-cyclohexylphenol, p-isoamylphenol, o-propylphenol, and p-ethylphenol.

In general, the amount of aldehyde and phenolic components employed, based upon the weight of the petroleum asphalt present, can, from a practical standpoint, vary between about 1% and about 25%, and preferably between about 5% and about 15%. As previously indicated, in order to effect condensation between the asphalt, aldehyde and phenolic components, the presence of an acidic catalyst is required during heat treatment. Suitable acidic catalysts include sulfuric acid, toluene acid, paratoluene sulfonic acid, the acidic residue from the sulfonic acid refining to tall oil, hydrochloric acid, phosphoric acid, and other strong mineral acids. The acidic catalyst may also include salts of any of the aforementioned acids. In general, however, the acidic catalyst should have a pH which is not higher than about 4, inasmuch as the use of acidic catalysts whose pH value is substantially above 4, has the effect of the acidic material ceasing to function as a catalyst, with the further result that a condensation reaction between the asphalt, aldehyde and phenolic components cannot take place.

The amount of catalyst employed, based upon the weight of the petroleum asphalt present, will, in general, vary between about 0.1% and about 5%, and preferably between about 0.1% and about 2%. The reaction between the petroleum asphalt, aldehyde and phenolic components, in the presence of the acidic catalyst, is carried out at a temperature which is sufficiently high to effect condensation between the aforementioned reactants. For this purpose, temperatures within the range from about 150° F. to about 600° F. may be employed, and, in many instances, preferably within the range from about 185° F. to about 400° F. The time of reaction will vary inversely with the temperature and may be carried out over a period varying from about 5 minutes to as high as about 6 hours. The reaction can also be carried out at superatmospheric pressures. When such elevated pressures are employed, higher temperatures and shorter reaction times can also be employed.

The reaction involved in preparing the compositions of the present invention for use as binders, can be carried out in several ways. The binder composite, for example, can be prepared by reacting the petroleum asphalt, aldehyde and phenolic components in the presence of the acidic catalyst, in the manner previously described. The resulting compositions can be applied to such materials as cellulosic materials, and, therefore, boards can be formed therefrom by molding under heat and pressure. The binder can be readily applied to the cellulosic material in the form of an aqueous suspension. Alternatively, the petroleum asphalt, aldehyde and phenolic reactants and the catalyst can be applied to the cellulosic material, and this material can then be molded under heat and pressure to form the binder in situ. As has been hereinbefore mentioned, the bonded products of the present invention may include particle board and plywood. These products are all prepared by the same general method of covering the surface of the cellulosic material with the binder, or with the reactants to form the binder in situ, and then heating under pressure. Particle board is prepared from various particles manufactured for such use, but may also include wood particles obtained as waste in sawmills, lumber yards, or carpentry shops. Such waste particles include sawdust, chips and shavings. Waste ends can also be used if they are comminuted to particulate form.

Wood particles coated with the binders, or with the aforementioned reactants to produce the binders in situ, are placed in a molding press of desired size and shape, and then subjected to heat and pressure. The compactness and hardness of the product particle board is governed to a greater extent to the amount of pressure used. In general, pressures from about 50 p.s.i.g. up to about 800 p.s.i.g. can be employed from a practical standpoint. The molding temperature, as previously indicated, may vary from about 150 to about 600° F., however, in a specific instance, molding should not be carried out at temperatures at which charring of the cellulosic material might occur. The molding time will be dependent upon the temperature and the flow characteristic of the prepared binder. Sufficient time must be allowed, to permit even flow, in order to provide boards of reasonable uniformity. When forming the binder in situ, the molding time is correlated with the temperature, as previously indicated.

Plywoods are formed by coating the surfaces of thin sheets of wood with the binders, or with the reactants to produce the binder in situ, as previously described. The coated wood sheets are then stacked one on top of another to the desired thickness, usually with the direction of the grain of adjacent sheets oriented at right angles. The stack of sheets or plies is then heated under pressure, as was discussed above in connection with particle boards. The amount of binder, or binder reactants, that is applied to the cellulosic material to form the particle boards or ply boards, is such that the finished board, will contain, by weight, between about 5% and about 30% of the binder.

With respect to further utility of the novel asphaltic compositions of the present invention, it has been found that bituminous pavements are not practical in locations where gasoline and jet fuel spillage, or high temperature exhausts from jet engines are encountered. However, surfaces treated with the novel compositions of the present invention, provide an acceptable surface layer or coating, which is resistant to gasoline, jet fuel and heat from jet engine exhaust screens.

The following examples will serve to illustrate the preparation of the aforementioned novel and improved asphaltic compositions of the present invention, and to demonstrate their utility and effectiveness as evidenced by the respective softening points and other characteristic data obtained.

*Example 1*

Thermal asphalt (171° F. softening point) (1000 grams), phenol (80 grams) and dioxane (1500 cc.), as a solvent, were heated to reflux temperature (220–230° F.). While stirring, a solution of paraformaldehyde (110 grams) in 1500 cc. of acetic acid and 10 grams of 96.5% sulfuric acid was added during a 15–20 minute period. Precipitation of solids was noted almost immediately. The reaction was held at reflux temperature (220° F.– data are set forth in Table II. Fiberboards were made using the binders of Runs 101–B and 103–B. Their properties are set forth in Table I (Boards 175–2 and 176–2, respectively).

TABLE I

| Binder Composition, Weight Ratio: | | | | | | | | | | |
|---|---|---|---|---|---|---|---|---|---|---|
| Thermal Asphalt | 1.00 | 1.00 | 1.00 | 1.00 | 1.00 | 1.00 | | | | |
| Furfural Extract | | | | | | | 1.00 | 1.00 | 1.00 | 1.00 |
| Paraformaldehyde | 0.11 | 0.11 | 0.11 | 0.11 | 0.11 | 0.11 | 0.11 | 0.17 | 0.17 | 0.22 |
| Phenol | 0.08 | 0.08 | 0.08 | | | | 0.08 | 0.12 | 0.12 | 0.08 |
| Nonyl Phenol | | | | 0.16 | 0.16 | 0.16 | | | | |
| Board Properties:[1] | | | | | | | | | | |
| Binder Content, percent weight of fibers | 21.8 | 21.2 | 18.7 | 18.7 | 18.7 | 19.3 | 17.5 | 20.0 | 20.0 | 23.5 |
| Density, lb./ft.$^3$ | 39.2 | 40.8 | 46.8 | 43.9 | 43.3 | 43.1 | 46.0 | 40.3 | 40.9 | 38.6 |
| Thickness, inches | 0.467 | 0.471 | 0.452 | 0.460 | 0.469 | 0.460 | 0.477 | 0.472 | 0.491 | 0.475 |
| Physical Testing Results (ASTM D1037-60T): | | | | | | | | | | |
| Modulus of Rupture, p.s.i. | 1,000 | 1,106 | 1,550 | 1,790 | 2,000 | 1,785 | 1,013 | 1,069 | 1,200 | 852 |
| Modulus of Elasticity, 1,000 p.s.i. | 228 | 262 | 330 | 447 | 427 | 420 | 272 | 248 | 276 | 225 |
| Tensile strength, p.s.i. | 432 | 644 | 927 | 1,077 | 1,208 | 971 | 774 | 625 | 596 | 507 |
| Direct Nail Pull, actual, lbs. | 39.3 | 48.5 | 60.5 | 62.3 | 77.0 | 66.6 | 60.0 | 45.5 | 54.0 | 37.0 |
| Direct Nail Pull, corrected,[2] lbs. | 45.8 | 50.1 | 48.0 | 56.8 | 72.0 | 63.3 | 46.5 | 48.3 | 52.7 | 44.1 |
| Lateral Nail Withdrawal, lbs. | 169 | 192 | 267 | 250 | 326 | 264 | 240 | 201 | 221 | 135 |
| Water Absorption (24 hours): | | | | | | | | | | |
| Weight Gain, percent | 16.8 | 10.6 | 11.0 | 11.5 | 9.1 | 10.3 | 8.4 | 13.0 | 22.4 | 15.3 |
| Thickness Increase, percent | 12.5 | 5.8 | 7.9 | 7.4 | 2.8 | 4.0 | 5.4 | 9.8 | 8.5 | 5.0 |
| Linear Increase, percent | 0.5 | 0.3 | 0.4 | 0.3 | 0.1 | 0.5 | 0.3 | 0.3 | 0.3 | 0.2 |
| Initial Water Content, percent weight | 4.0 | 3.5 | 4.2 | 4.3 | 3.5 | 3.7 | 3.3 | 3.5 | 3.7 | 2.8 |
| Board Identification | 179-1 | 179-2 | 179-3 | 180-1 | 180-2 | 180-3 | 175-2 | 176-2 | 160 | 162 |

[1] In addition to the binder each board contains about 1% wax sizing and about 2% alum.
[2] Corrected to 40 lb./ft.$^3$ density and 0.50 inch thickness.

TABLE II

| Reactant Mole Ratio: | | | | | | | | |
|---|---|---|---|---|---|---|---|---|
| Furfural Extract | 1 | 1 | 1 | 1 | 1 | 1 | 1 | 1 |
| Paraformaldehyde | 0 | 2.1 | 2.1 | 2.1 | 3.2 | 4.3 | 3.2 | 3.2 |
| Phenol | 0 | 0 | 2.0 | 0.5 | 0.75 | 0.5 | 0.24 | 0.5 |
| Reactant Weight Ratio: | | | | | | | | |
| Furfural Extract | 1 | 1 | 1 | 1 | 1 | 1 | 1 | 1 |
| Paraformaldehyde | 0 | 0.11 | 0.11 | 0.11 | 0.17 | 0.22 | 0.17 | 0.17 |
| Phenol | 0 | 0 | 0.32 | 0.08 | 0.12 | 0.08 | 0.04 | 0.08 |
| Product Properties: | | | | | | | | |
| Molecular Weight | 580 | 730 | | 930 | 1,600 | 1,145 | 930 | 1,070 |
| Soft Point, °F | 49 | 84 | 287 | 215 | 342 | 290 | 178 | 245 |
| Oxygen Content, percent weight | 1.25 | | | 1.87 | 5.21 | 3.18 | 2.60 | 3.05 |
| Average Shear Strength, p.s.i. | 0 | | | 120 | 175 | 20 | 0 | 17 |
| Color on Painting | ([1]) | ([1]) | ([2]) | ([3]) | ([3]) | ([3]) | ([3]) | |
| Run Number | | 79B | 88B | 101B | 102B | 103B | 104B | 107B |

[1] Dark Brown.
[2] Light Grey.
[3] Light Yellow.

230° F.) for an additional two hours after which the reactor contents were cooled, the liquid and solid phases separated, and the residual solvent in the solid phase removed by heating to 300° F. under about 1″ Hg pressure. This solid product was used to make Boards 179–1, 179–2, and 179–3, whose properties are shown in Table I.

*Example 2*

A binding material was produced from thermal asphalt in a manner similar to Example 1 except that 160 grams of nonyl phenol was used in place of the phenol. The solid product from this reaction was used in Boards 180–1, 180–2 and 180–3 shown in Table I. It is obvious from the improved board strength properties that this material is superior to the binder of Example 1.

*Example 3*

Furfural extract (softening point 49° F., mol. wt. 580) (1000 grams) having the properties shown in Table II was reacted with 170 grams of paraformaldehyde and 120 grams of phenol in a solvent mixture of 1500 cc. of p-dioxane and 1500 cc. acetic acid. The reaction was carried out at reflux temperature (220–230° F.) for two hours after which time the solvent was removed by heating to a maximum temperature of 300° F. The resulting product had the properties shown in Table II for Run 102–B. Properties of fiberboards made with this binder (Boards 160 and 176–2) appear in Table I.

*Example 4*

Using the procedure described in Example 3, a series of binders were made using varying ratios of furfural extract, paraformaldehyde, and phenol. The pertinent data in Table I, it will be apparent that fiberboards having various properties can be made using the binders of this invention. Properties of binders can be varied by varying the amounts of the components.

*Example 5*

A reaction similar to that described in Example 1 was run using Syn-Tower Bottoms (7.8° API. 161.4 aniline point, 430 molecular weight and 940° F. mean average boiling point) as the petroleum charge stock. A solid product with a softening point of >350° F. was produced by this reaction.

Although the present invention has been described with preferred embodiments, it will be understood that various modifications and adaptations thereof may be resorted to, without departing from the spirit and scope of the invention, as those skilled in the art will readily appreciate.

We claim:

1. An improved asphaltic composition obtained by reacting a major proportion of a petroleum asphalt with minor proportions of an aldehyde and a phenolic compound selected from the group consisting of phenol and alkyl phenols in the presence of an acidic catalyst having a pH not higher than about 4 at a temperature sufficient to effect condensation between said reactants.

2. An improved asphaltic composition obtained by reacting a major proportion of a petroleum asphalt with minor proportions of an aldehyde and a phenolic compound selected from the group consisting of phenol and alkyl phenols in the presence of an acidic catalyst having a pH not higher than about 4 at a temperature from about 150° F. to about 600° F.

3. An improved asphaltic composition obtained by reacting a major proportion of a petroleum asphalt with a minor proportion of at least one aldehyde selected from the group consisting of formaldehyde and formaldehyde polymers and a minor proportion of a phenolic compound selected from the group consisting of phenol and alkyl phenols in the presence of an acidic catalyst having a pH not higher than about 4 at a temperature from about 150° F. to about 600° F.

4. A paving material coated with the composition defined by claim 1.

5. A composite for producing a binder which comprises: a major proportion of a petroleum asphalt and minor proportions of an aldehyde, a phenolic compound selected from the group consisting of phenol and alkyl phenols and an acidic catalyst having a pH not higher than about 4.

6. A composite for producing a binder which comprises: a petroleum asphalt and, based upon the weight of said asphalt, from about 1% to about 25% of an aldehyde, from about 1% to about 25% of a phenolic compound selected from the group consisting of phenol and alkyl phenols, and from about 0.1% to about 5% of an acidic catalyst having a pH not higher than about 4.

7. A composite for producing a binder which comprises: thermal asphalt and, based upon the weight of said asphalt, from about 1% to about 25% of formaldehyde, from about 1% to about 25% of nonyl phenol, and from about 0.1% to about 5% of an acidic catalyst having a pH not higher than about 4.

8. A composite for producing a binder which comprises a furfural extract of petroleum asphalt and, based upon the weight of said furfural extract, from about 1% to about 25% of formaldehyde, from about 1% to about 25% of phenol, and from about 0.1% to about 5% of an acidic catalyst having a pH not higher than about 4.

References Cited by the Examiner

UNITED STATES PATENTS

| | | | |
|---|---|---|---|
| 1,911,131 | 5/1933 | Langenberg | 260—28 |
| 2,314,181 | 3/1943 | Winterkorn | 260—28.5 |
| 2,531,863 | 11/1950 | Scott et al. | 260—56 |
| 2,884,391 | 4/1959 | Winter et al. | 260—28 |

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,301,803 January 31, 1967

John W. Schick et al.

It is hereby certified that error appears in the above numbered patent requiring correction and that the said Letters Patent should read as corrected below.

In the heading to the printed specification, line 5, for "Mobil Oil Company" read -- Mobil Oil Corporation --; column 2, lines 34 and 43, strike out "asphatic", each occurrence, and insert instead -- asphaltic --; column 3, line 41, for "toluene acid" read -- toluene sulfonic acid --.

Signed and sealed this 17th day of October 1967.

(SEAL)
Attest:

Edward M. Fletcher, Jr.
Attesting Officer

EDWARD J. BRENNER
Commissioner of Patents